United States Patent
Chen

(10) Patent No.: US 8,162,580 B2
(45) Date of Patent: Apr. 24, 2012

(54) ANTI-THEFT FASTENER

(76) Inventor: Antony Chen, Taichung (TW)

( * ) Notice: Subject to any disclaimer, the term of this patent is extended or adjusted under 35 U.S.C. 154(b) by 403 days.

(21) Appl. No.: 12/435,554

(22) Filed: May 5, 2009

(65) Prior Publication Data

US 2010/0284764 A1    Nov. 11, 2010

(51) Int. Cl.
*F16B 39/282* (2006.01)
*F16B 39/32* (2006.01)
*F16B 31/00* (2006.01)

(52) U.S. Cl. ............. 411/187; 411/4; 411/132; 411/910
(58) Field of Classification Search ............. 411/2, 140, 411/3, 4, 81, 132, 103, 106, 166, 167, 910, 411/8, 187, 188, 388

See application file for complete search history.

(56) References Cited

U.S. PATENT DOCUMENTS

| | | | | |
|---|---|---|---|---|
| 1,380,395 A * | 6/1921 | Korach | | 411/3 |
| 3,267,792 A * | 8/1966 | Yackle | | 411/4 |
| 4,540,322 A * | 9/1985 | Coffia | | 411/338 |
| 4,602,903 A * | 7/1986 | Wilburn | | 411/222 |
| 4,820,235 A * | 4/1989 | Weber et al. | | 411/188 |
| 5,207,588 A * | 5/1993 | Ladouceur et al. | | 439/84 |
| 5,256,015 A * | 10/1993 | St. Clair | | 411/4 |
| 5,441,417 A * | 8/1995 | Ladouceur et al. | | 439/84 |
| 5,644,830 A * | 7/1997 | Ladouceur et al. | | 29/432.2 |
| 5,870,934 A * | 2/1999 | Cullinan | | 81/436 |
| 6,061,870 A * | 5/2000 | Dodge et al. | | 16/2.1 |
| 7,261,506 B2 * | 8/2007 | Smolarek | | 411/161 |
| 7,938,608 B1 * | 5/2011 | Jordan | | 411/187 |

* cited by examiner

*Primary Examiner* — Victor Batson
*Assistant Examiner* — Tyler Johnson
(74) *Attorney, Agent, or Firm* — Christopher P. Maiorana, PC

(57) ABSTRACT

The anti-theft fastener has a shearing head, a shaft and a fastening element. The shearing head has at least one shearing tab. The shaft is threaded and connected the shearing head. The fastening element is mounted around the shearing head and has an outer surface having a countersink and at least one shearing recess. The countersink is formed in the outer surface around the connecting hole. The at least one shearing recess is formed in countersink, and corresponds to the at least one shearing tab, and each shearing recess has at least one shearing surface, whereby the at least one shearing tab is broken off by the shearing surface of the fastening element.

17 Claims, 11 Drawing Sheets

ANTI-THEFT FASTENER

BACKGROUND OF THE INVENTION

1. Field of the Invention

The present invention relates to a fastener, and more particularly to an anti-theft fastener providing steady locking and good burglarproof effect.

2. Description of Related Art

With reference to FIGS. 10 and 11, a conventional anti-theft fastener may be used to lock a license plate (81) on a vehicle frame (82) and has a collar (91), a screw (92) and a cap (93).

The license plate (81) has two elongated locking holes (810) being formed through the license plate (81).

The collar (91) has a bottom board (911), a screw hole (912), a rim (913) and a protrusion (914). The bottom board (911) is circular and has an outer surface abutting the license plate (81). The screw hole (912) is formed through the bottom board (911) and aligns with one of the locking holes (810). The rim (913) is annular and is formed around and protrudes from the plate bottom (911) and has an opening. The protrusion (914) is formed on and protrudes from the outer surface of the plate bottom (911) and is mounted in the corresponding locking hole (810) in the license plate (81). The screw (92) is mounted through the screw hole (912) of the collar (91) and the corresponding locking hole (810) of the license plate (81), and is screwed into the license plate (81) on the vehicle frame (82), and has a screw head being held in the collar (91).

The cap (93) is mounted in and closes the opening of the collar (91) to prevent access to and hold the screw (92) in the collar (91), such that the screw (92) cannot be released easily.

However, the conventional anti-theft fastener can only be locked from the outside of the vehicle frame (82) and cannot be locked from the inside the vehicle frame (82), so is not versatile in use.

Furthermore, setting of the conventional anti-theft fastener needs both a screwdriver to screw the screw (92) and a hammer to hammer the cap (93), so is not convenient to use.

To overcome the shortcomings, the present invention tends to provide an anti-theft fastener to mitigate or obviate the aforementioned problems.

SUMMARY OF THE INVENTION

The main objective of the invention is to provide an anti-theft fastener providing a steady locking and good burglarproof effect.

The anti-theft fastener in accordance with the present invention has a shearing head, a shaft and a fastening element. The shearing head has at least one shearing tab. The shaft is threaded and connected the shearing head. The fastening element is mounted around the shearing head and has an outer surface having a countersink and at least one shearing recess. The countersink is formed in the outer surface around the connecting hole. The at least one shearing recess is formed in countersink, and corresponds to the at least one shearing tab, and each shearing recess has at least one shearing surface, whereby the at least one shearing tab is broken off by fastening element abutting the shearing surface.

Other objects, advantages and novel features of the invention will become more apparent from the following detailed description when taken in conjunction with the accompanying drawings.

DETAILED DESCRIPTION OF PREFERRED EMBODIMENT

Figure 1:
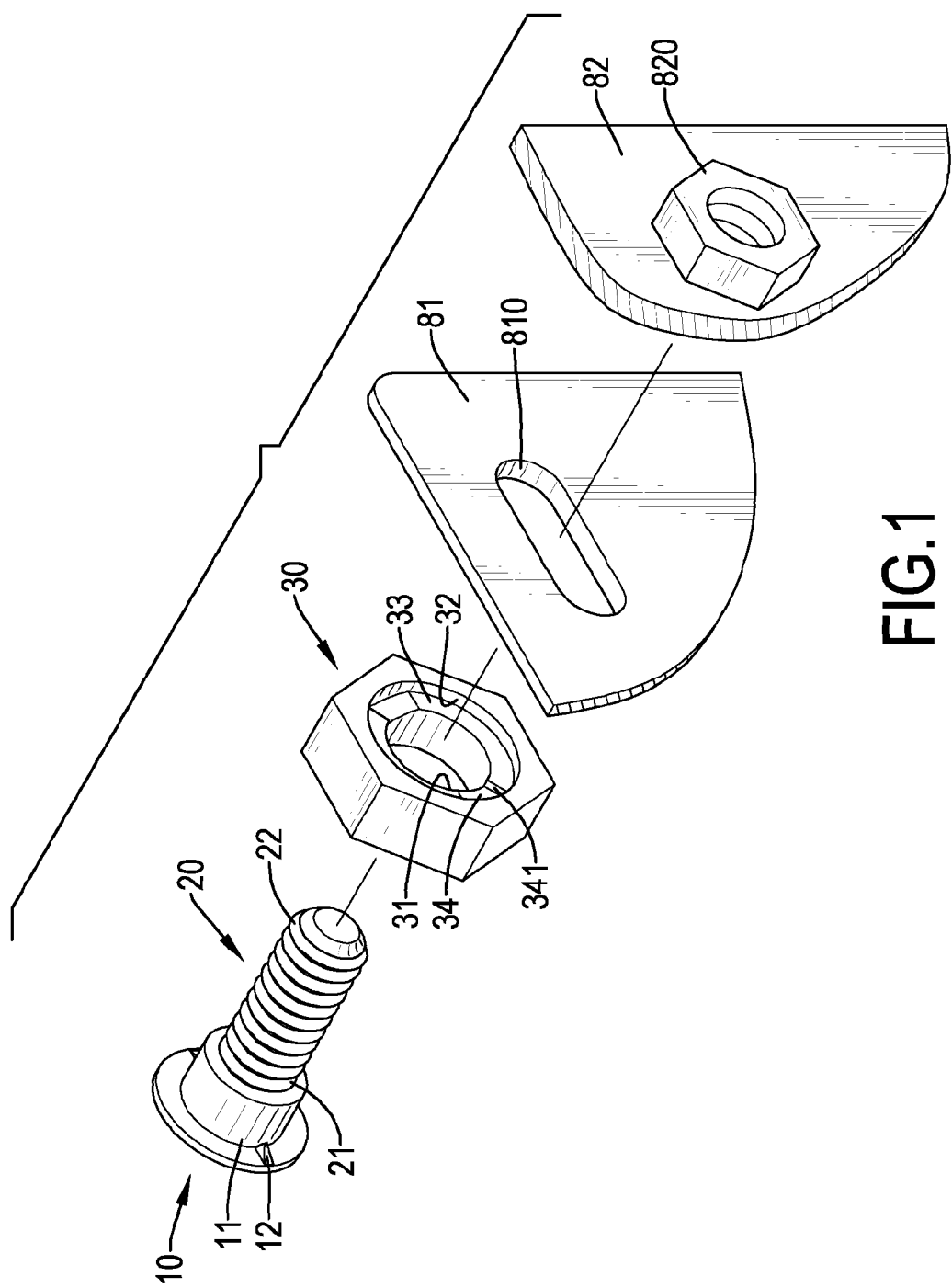
FIG. 1 is an exploded perspective view of a first embodiment of an anti-theft fastener in accordance with the present invention.

With reference to FIGS. 1 to 4, an anti-theft fastener in accordance with the present invention is used to mount a license plate (81) on a vehicle frame (82), and has at least one shearing head (10,10A,10B), a shaft (20,20A,20C) and at least one fastening element (30). The license plate (81) has an elongated locking hole (810) formed through the license plate (81). The vehicle frame (82) may be a frame or a case of an automobile, a motorcycle, a truck, or the like, and may have a through hole and a fixed nut (820) aligning with the through hole.

The at least one shearing head (10,10A,10B) may be formed securely on or mounted rotatably on the shaft (20) and each has an inner surface, an edge, a mounting tube (11) and at least one shearing tab (12).

Figure 5:
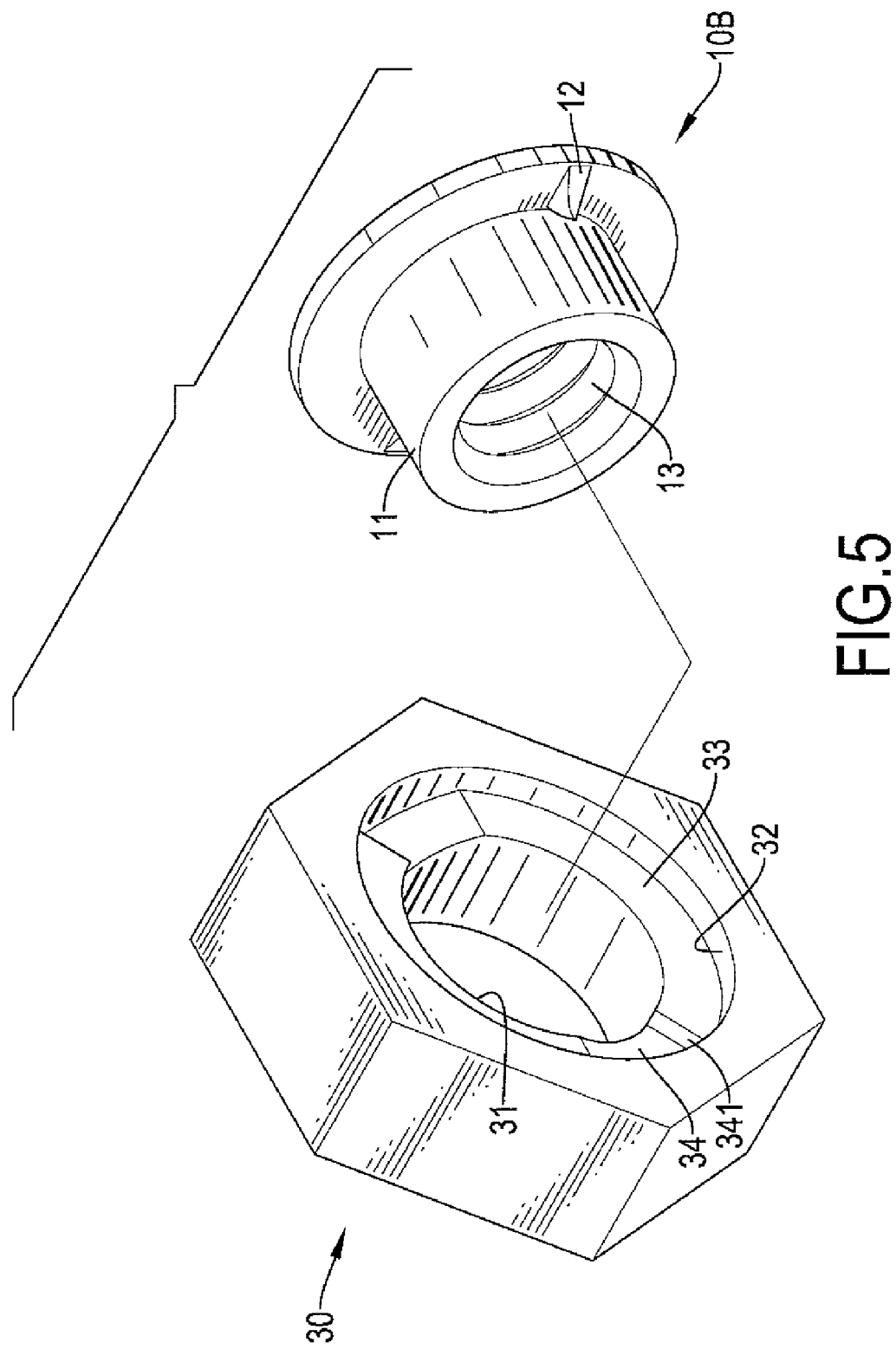
FIG. 5 is an enlarged perspective view of a shearing head and a fastening element of the anti-theft fastener in FIG. 3.
Figure 6:
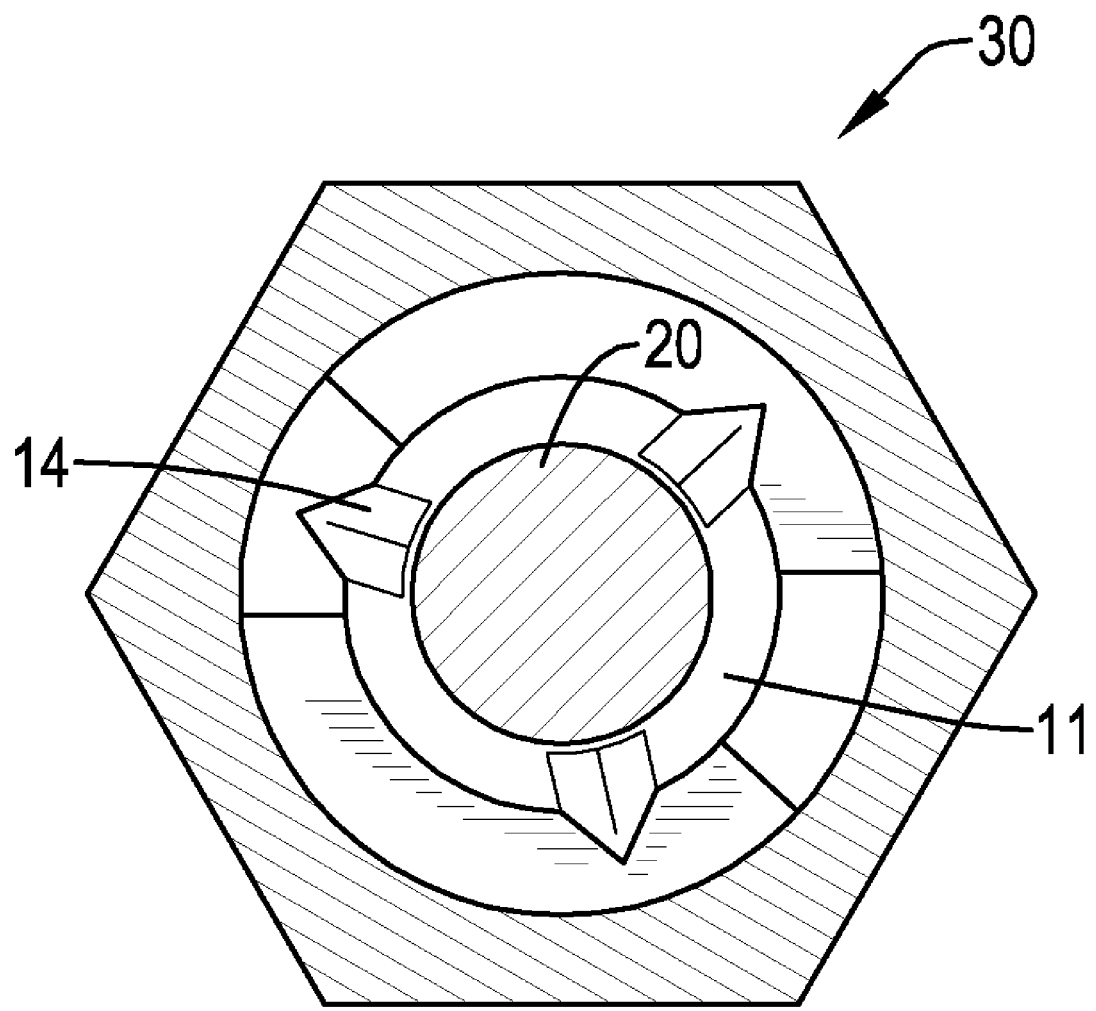
FIG. 6 is a cross sectional end view of the anti-theft fastener in FIG. 1.

With further reference to FIGS. 5 and 6, the mounting tube (11) is formed on and protrudes centrally from the inner surface of the shearing head (10,10B) and has an annular surface, a threaded hole (13), a distal edge and multiple bosses (14). The threaded hole (13) is formed through the mounting tube (11) of the shearing head (10,10B) and may be mounted around the shaft (20). The annular surface of the mounting tube (11) may be smooth. The multiple bosses (14) are formed on and protrude transversely from the distal edge of the mounting tube (11) and may be punched out from the mounting tube (11).

The at least one shearing tab (12) is formed on and protrudes from the inner surface of the shearing head (10,10A, 10B) and may be formed on the annular surface of the mounting tube (11), may be quadrangular or triangular and may taper toward the edge of the shearing head (10,10A,10B). When the at least one shearing head (10,10A,10B) has two shearing tabs (12), the shearing tabs (12) are oppositely formed on the inner surface of the shearing head (10,10A, 10B).

Figure 3:
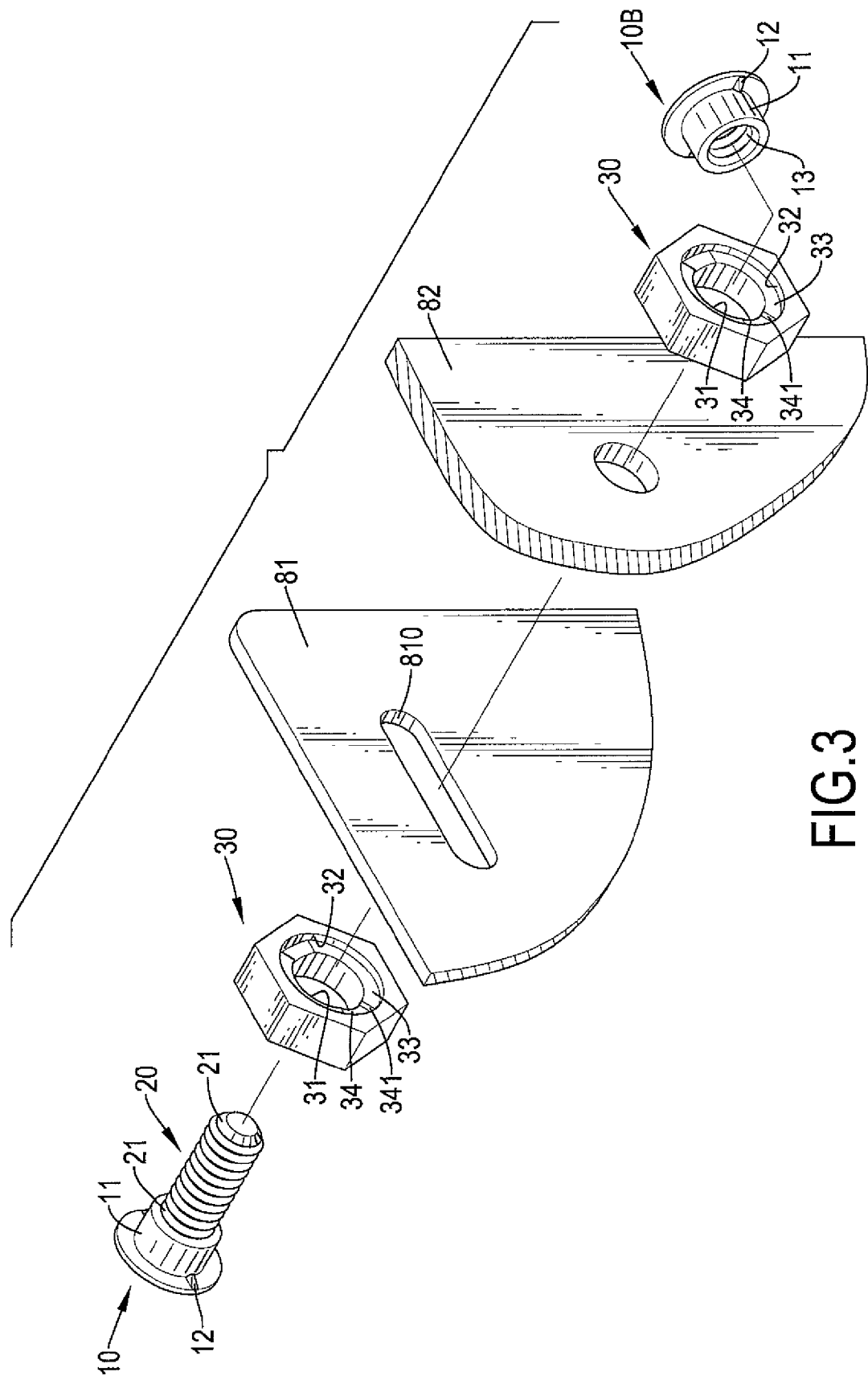
FIG. 3 is an exploded perspective view of a third embodiment of an anti-theft fastener in accordance with the present invention.
Figure 4:
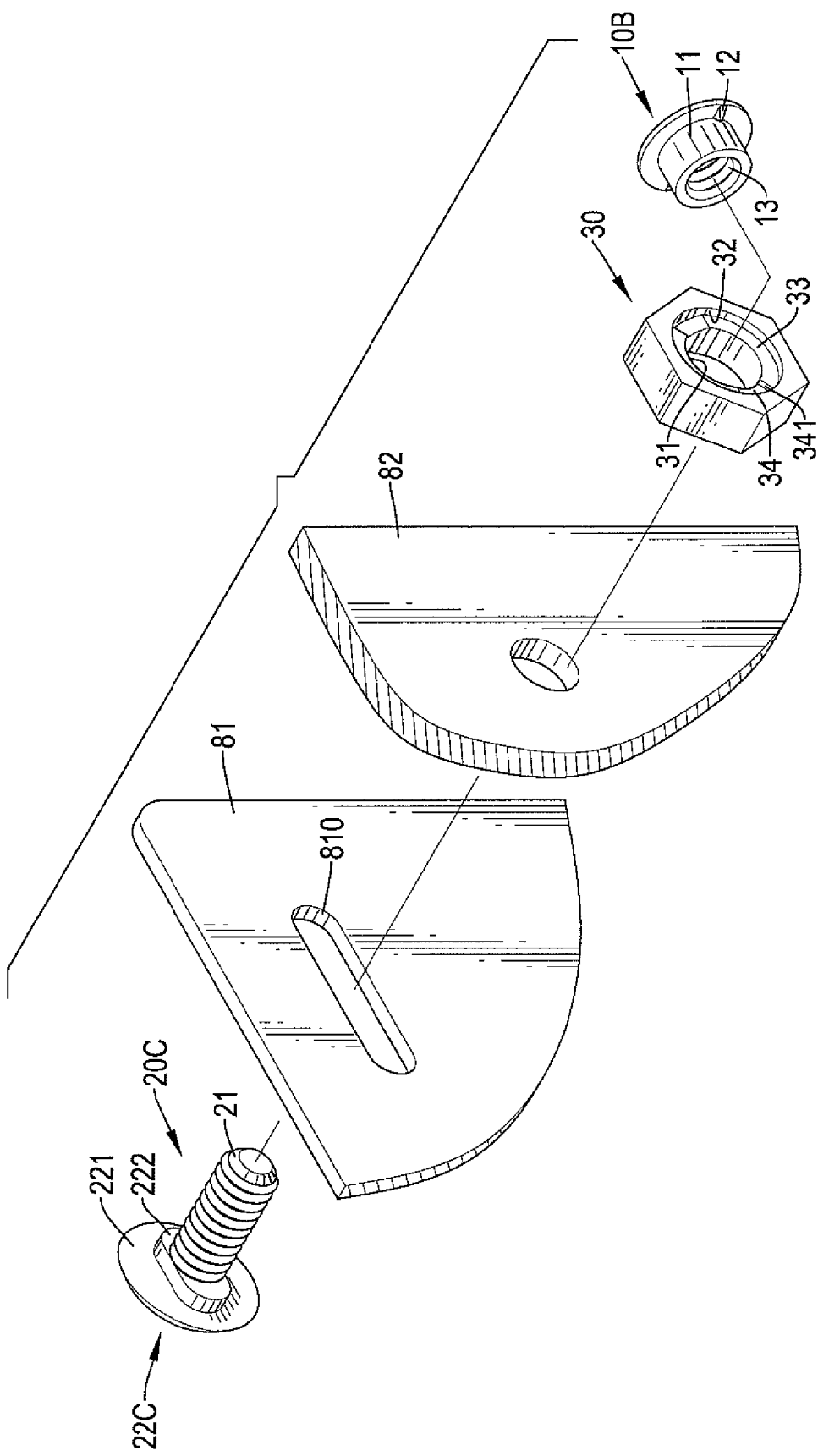
FIG. 4 is an exploded perspective view of a fourth embodiment of an anti-theft fastener in accordance with the present invention.

The shaft (20,20A,20C) has two ends and may be threaded. The ends of the shaft (20,20A,20C) may be at least one shearing end (21) and an optional distal end (22,22A,22C). The shearing end (21) of the shaft (20,20A,20C) may be formed on and protrude from the mounting tube (11) of the shearing head (10,10A), or may be rotatably mounted in the threaded hole (13) of the mounting tube (11) of the shearing head (10B). The distal end (22,22A,22C) of the shaft (20A 20C) may be pointed or may have a cap (221) formed thereon as shown in FIG. 4. The cap (221) may have an elliptical shoulder (222) formed on and protruding from the cap (221) adjacent to the shaft (20C), corresponding to and being mounted in the locking hole (810) of the license plate (81). The shaft (20) may have two shearing ends (21) as shown in FIG. 3. The shearing ends (21) of the shaft (20) may respectively have a shearing head (10B) connected thereto.

With further reference to FIGS. 5 and 6, the fastening element (30) is mounted around the shaft (20) of the anti-theft fastener, and may be hexagonal, and has a connecting hole (31), an outer surface and an inner surface. The connecting hole (31) is formed through the fastening element (30) and mounted around the mounting tube (11). The outer surface of the fastening element (30) has a countersink (32), an abutting surface (33), and at least one shearing recess (34). The countersink (32) is formed in the outer surface of the fastening element (30) around the connecting hole (31). The abutting surface (33) is formed in the countersink (32) around the connecting hole (31). The at least one shearing recess (34) is formed in the abutting surface (33) and has at least one shearing surface (341), an optional slope, an outer edge and an inner edge. The shearing surface (341) may be parallel with the connecting hole (31). The slope is formed in the abutting surface (33) from the abutting surface (33) to the shearing surface (341). The slope may be inclined from a point adjacent to the abutting surface (33) and the outer edge of the shearing recess (34) and deepens toward a point adjacent to the shearing surface (341) and the inner edge of the shearing recess (34). The inner surface of the fastening element (30) may have a groove formed in the inner surface around the connecting hole (31) of the fastening element (30) or may be the same as the outer surface of the fastening element (30) for containing the bosses (14) of the mounting tube (11) of the shearing head (10B).

The multiple bosses (14) may be punched after the mounting tube (11) is mounted through the fastening element (30) and protrude into the groove of the inner surface, or the countersink (32) of the inner surface of the fastening element (30).

Figure 2:
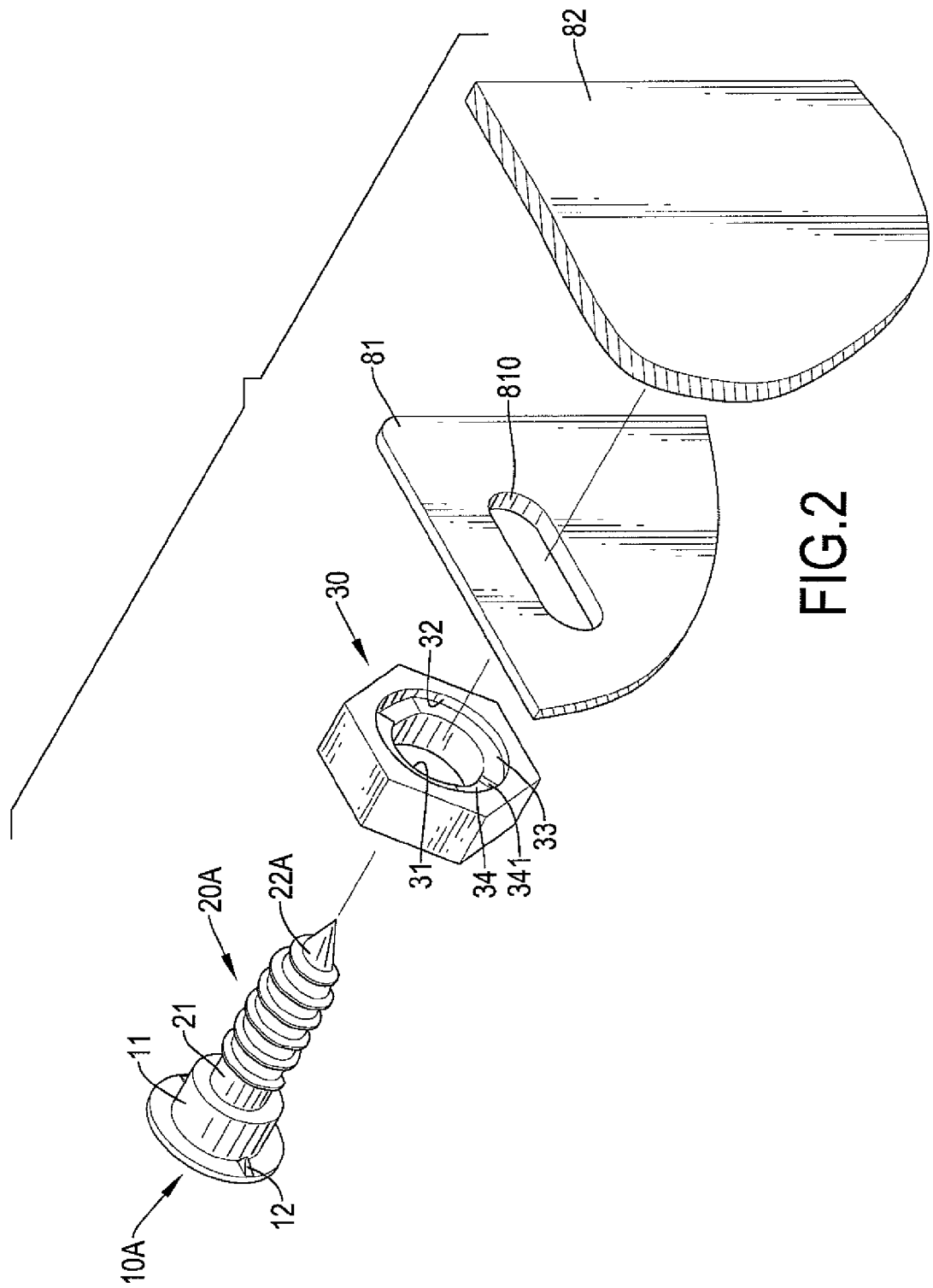
FIG. 2 is an exploded perspective view of a second embodiment of an anti-theft fastener in accordance with the present invention.

With reference to FIG. 1, when one shearing head (10) is implemented and fixed on the shaft (20), the mounting tube (11) of the shearing head (10) is smooth, the shearing tabs (12) are formed on the mounting tube (11) and the shearing end (21) of the shaft (20) is formed on and protrudes from the mounted tube (11). With further reference to FIG. 2, the distal end (22A) of the shaft (20A) is pointed.

With further reference to FIG. 3, when two shearing heads (10, 10B) and two shearing end (21) of the shaft (20) are implemented, one shearing end (21) of shaft (20) is fixed on the mounting tube (11) of a corresponding shearing head (10) and the other shearing end (21) of the shaft (20) is rotatably and detachably mounted in a corresponding shearing head (10B). The mounting tubes (11) are smooth. The shearing tabs (12) are formed on corresponding mounting tubes (11).

With further reference to FIG. 4, when one shearing head (10B) is implemented, the mounting tube (11) of the shearing head (10B) is smooth, the shearing tabs (12) are formed on the mounting tube (11), the mounting tube (11) is rotatably and detachably mounted around the shearing end (21) of the shaft (20C) and the distal end (22C) of the shaft (20C) has the cap (221) having the elliptical shoulder (222).

Figure 7:
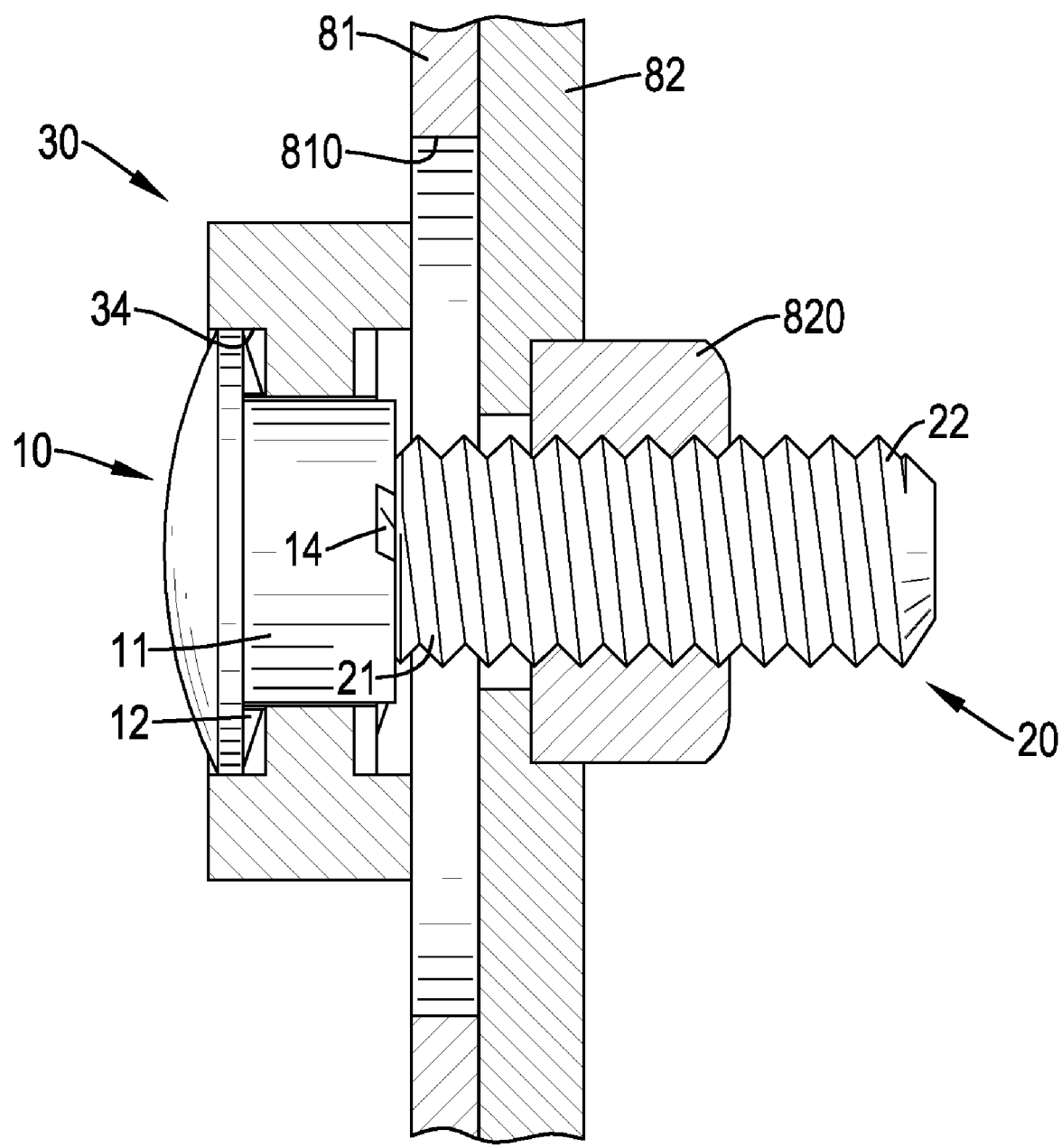
FIG. 7 is a side view in partial section of the anti-theft fastener in FIG. 1.
Figure 8:
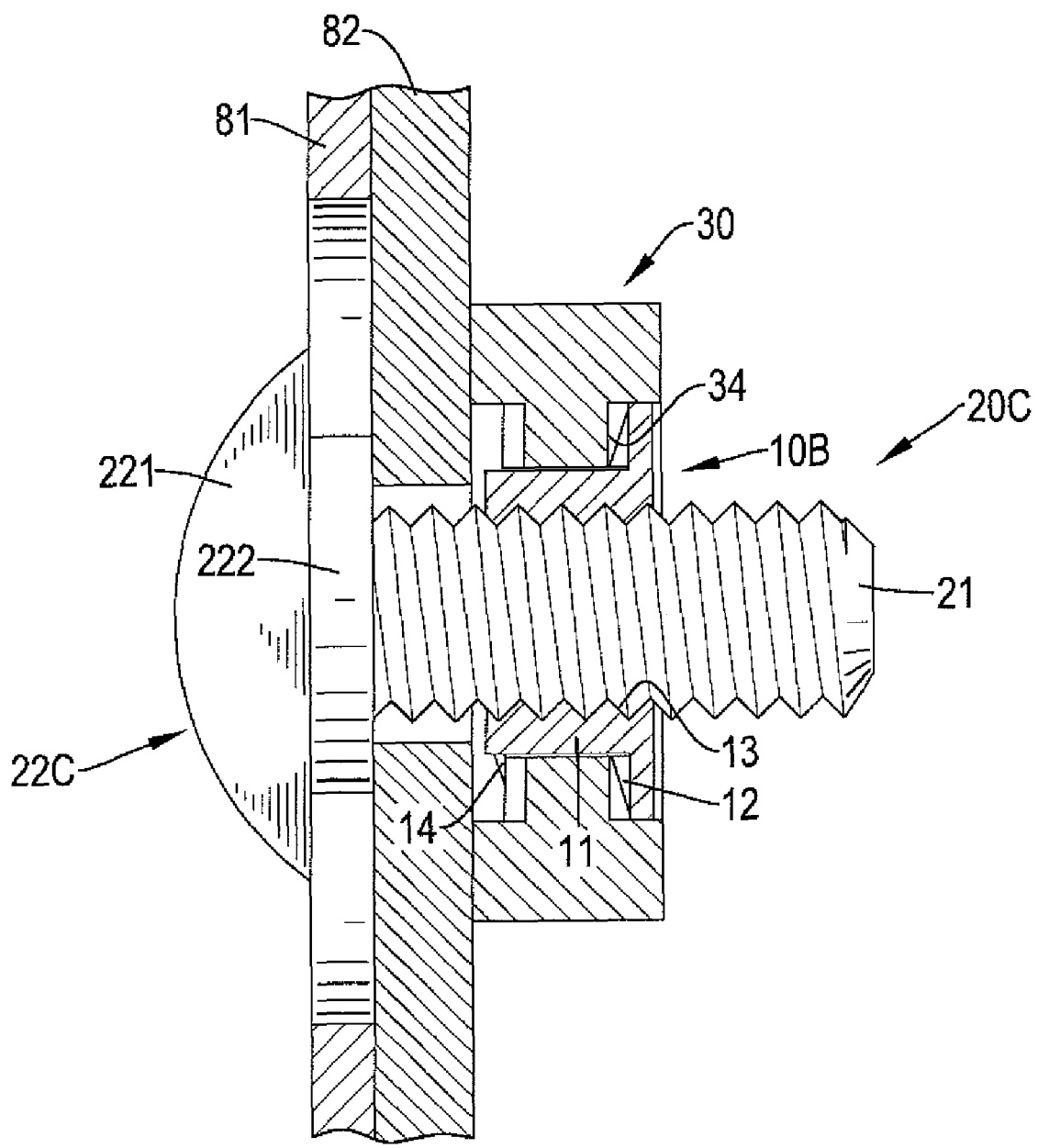
FIG. 8 is a side view in partial section of the anti-theft fastener in FIG. 4.
Figure 9:
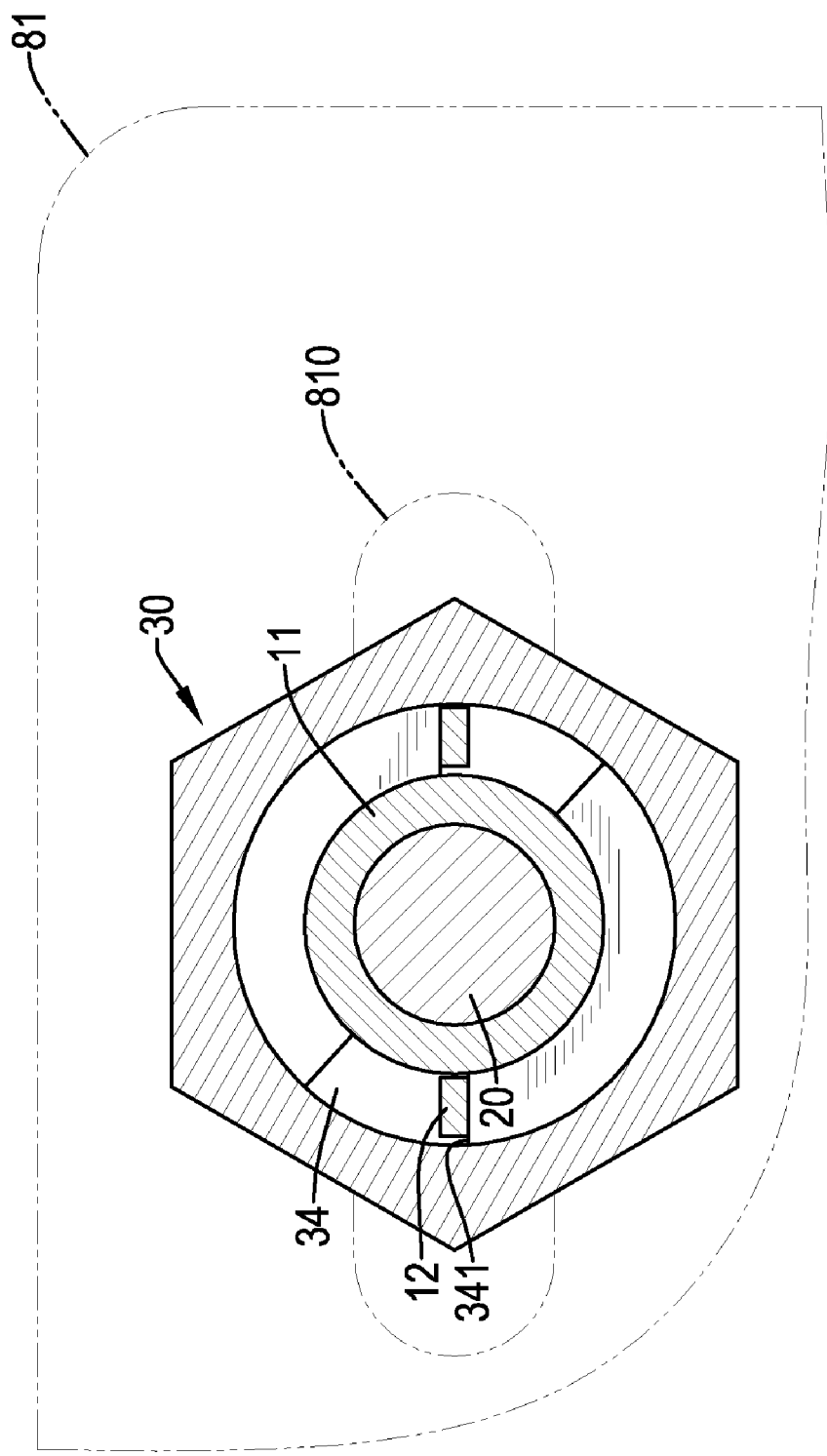
FIG. 9 is a cross sectional end view of the anti-theft fastener in FIG. 1 showing the shearing tabs.
Figure 10:
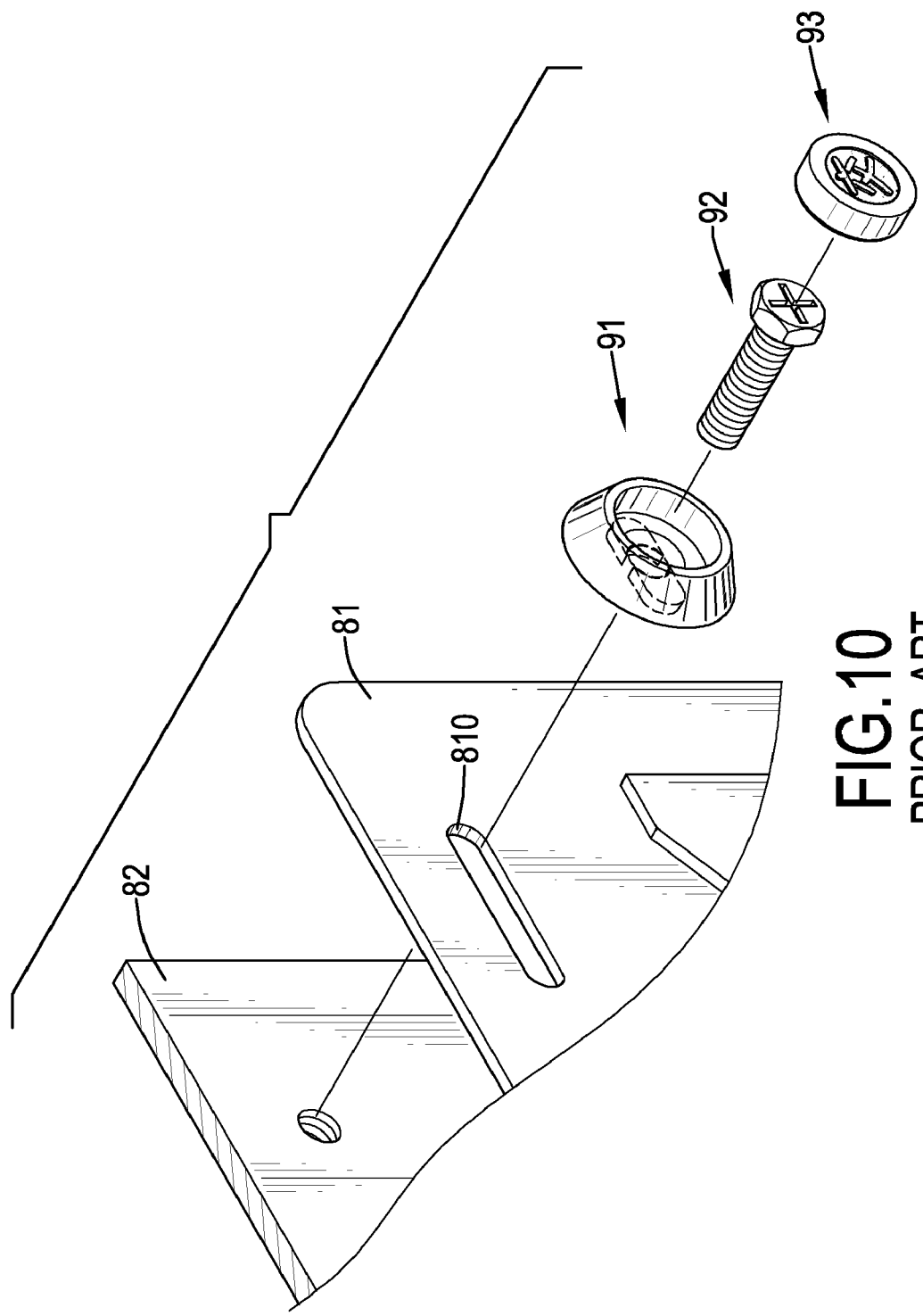
FIG. 10 is an exploded perspective view of a conventional anti-theft fastener in accordance with the prior art.
Figure 11:
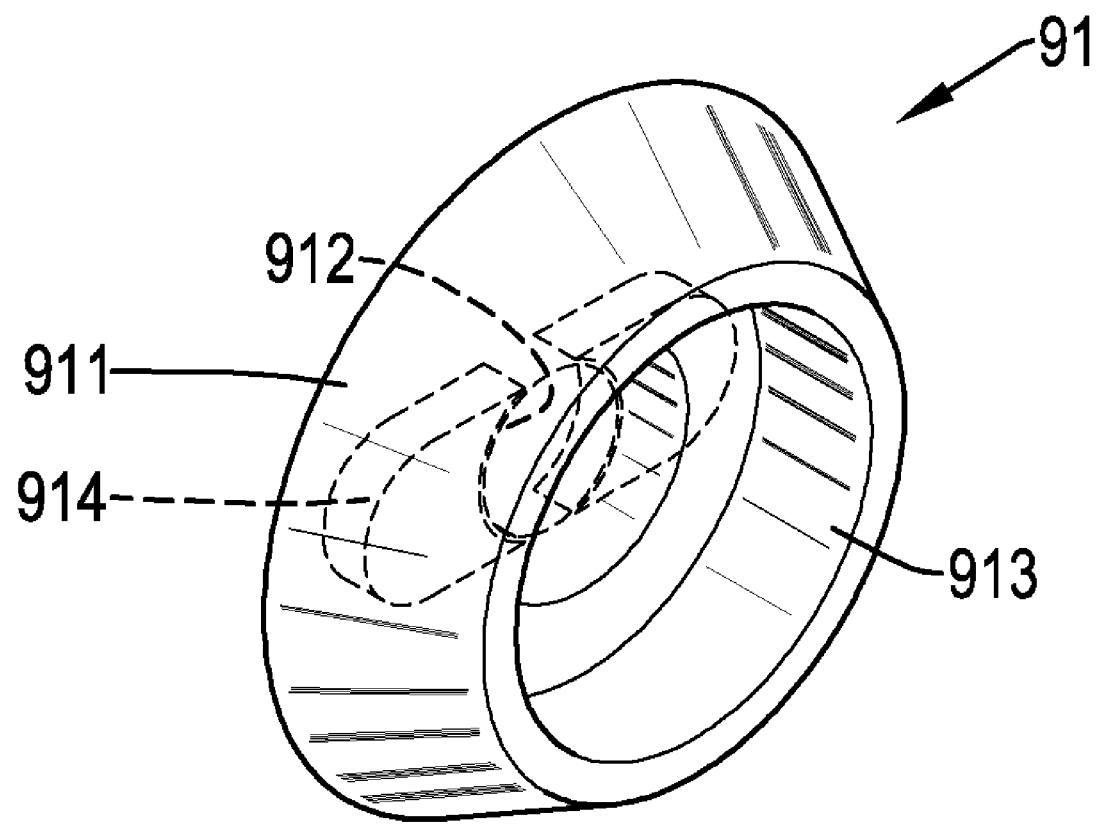
FIG. 11 is an enlarged perspective view of a collar of the conventional anti-theft fastener in FIG. 10.

With reference to FIGS. 7, 8 and 9, to use the anti-theft fastener, the shaft (20,20C) is mounted through the locking hole (810) of the license plate (81) and the vehicle frame (82). Then the fastening element (30) is turned using a tool. By turning the fastening element (30), the shearing head (10) is rotated and the anti-theft fastener tightens against the license plate (81). Once tightened to a predetermined torque, the shearing tabs (12) are broken off by the shearing surface (341) and further turning of the fastening element (30) does not rotate the shearing head (10) so the antitheft fastener cannot be undone using a wrench.

With further reference to FIG. 7, the distal end (22) of the shaft (20) may engage the nut (820) of the vehicle frame (82). With further reference to FIG. 2, when the distal end (22A) of the shaft (20A) is pointed, the distal end (22A) pierces and engages the vehicle frame (82). With further reference to FIG. 8, when the distal end (22C) of the shaft (20C) has a cap (221), the cap (221) abuts the license plate (81). Alternatively, two shearing heads (10,10B) are implemented, respectively abutting the vehicle frame (82) and the license plate (81). Therefore, the anti-theft fastener connects the license plate (81) on the vehicle frame (82) securely and cannot be undone by a tool like the wrench to provide a good burglarproof effect.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. An anti-theft fastener comprising:
   at least one shearing head, and each one of the at least one shearing head having
      an inner surface;
      a mounting tube being formed on and protruding from the inner surface of the shearing head and having an annular surface; and
      at least one shearing tab being formed on the shearing head; and
   a shaft being threaded and connected with the at least one shearing head and having
      at least one shearing end, and each one of the at least one shearing end being connected with the mounting tube of one of the at least one shearing head; and
   at least one fastening element, and each one of the at least one fastening element being mounted around the mounting tube of one of the at least one shearing head and having
      a connecting hole being formed through the fastening element around the mounting tube of the corresponding shearing head;
      an outer surface having
         a countersink being formed in the outer surface around the connecting hole;
         an abutting surface being formed in the countersink around the connecting hole; and
         at least one shearing recess being formed in the abutting surface, corresponding to the at least one shearing tab on the corresponding shearing head, and each one of the at least one shearing recess having at least one shearing surface, whereby the at least one shearing tab on the corresponding shearing head is broken off by the at least one shearing surface abutting the at least one shearing surface on the corresponding shearing head.

2. The anti-theft fastener as claimed in claim 1, wherein
the mounting tube of each one of the at least one shearing head further has a distal edge and multiple bosses being formed on and protrude transversely from the distal edge of the mounting tube;
each one of the at least one fastening element further has
an inner surface being opposite the outer surface of the fastening element; and
a groove being formed in the inner surface around the connecting hole of the fastening element for containing the bosses of the mounting tube of the corresponding shearing head.

3. The anti-theft fastener as claimed in claim 1, wherein
each one of the at least one shearing head further has an edge;
the at least one shearing tab of each one of the at least one shearing head is formed on the annular surface of the mounting tube and tapered toward the edge of the shearing head; and
each one of the at least one shearing recess of each one of the at least one fastening element further has
an outer edge;
an inner edge; and
a slope being formed in the abutting surface from the abutting surface to the shearing surface of the shearing recess.

4. The anti-theft fastener as claimed in claim 1, wherein
one shearing head is implemented and fixed on the shaft; and
one shearing end of the shaft is implemented and formed on and protrudes from the mounted tube of the shearing head.

5. The anti-theft fastener as claimed in claim 2, wherein
one shearing head is implemented and fixed on the shaft; and
one shearing end of the shaft is implemented and formed on and protrudes from the mounted tube of the shearing head.

6. The anti-theft fastener as claimed in claim 3, wherein
one shearing head is implemented and fixed on the shaft; and
one shearing end of the shaft is implemented and formed on and protrudes from the mounted tube of the shearing head.

7. The anti-theft fastener as claimed in claim 4, wherein
the shaft further has a distal end being opposite the shearing end of the shaft and being pointed.

8. The anti-theft fastener as claimed in claim 5, wherein
the shaft further has a distal end being opposite the shearing end of the shaft and being pointed.

9. The anti-theft fastener as claimed in claim 6, wherein
the shaft further has a distal end being opposite the shearing end of the shaft and being pointed.

10. The anti-theft fastener as claimed in claim 1, wherein
one shearing head is implemented and further has a threaded hole being formed through the mounting tube of the shearing head; and
one shearing end of the shaft is implemented, and rotatably and detachably mounted in the threaded hole of the mounting tube of the shearing head; and
the shaft has further has a distal end having
a cap being formed on the distal end of the shaft and having an elliptical shoulder being formed on and protruding from the cap adjacent to the shaft.

11. The anti-theft fastener as claimed in claim 2, wherein
one shearing head is implemented and further has a threaded hole being formed through the mounting tube of the shearing head; and
one shearing end of the shaft is implemented, and rotatably and detachably mounted in the threaded hole of the mounting tube of the shearing head; and
the shaft has further has a distal end having
a cap being formed on the distal end of the shaft and having an elliptical shoulder being formed on and protruding from the cap adjacent to the shaft.

12. The anti-theft fastener as claimed in claim 3, wherein
one shearing head is implemented and further has a threaded hole being formed through the mounting tube of the shearing head; and
one shearing end of the shaft is implemented, and rotatably and detachably mounted in the threaded hole of the mounting tube of the shearing head; and
the shaft has further has a distal end having
a cap being formed on the distal end of the shaft and having an elliptical shoulder being formed on and protruding from the cap adjacent to the shaft.

13. The anti-theft fastener as claimed in claim 1, wherein
two shearing ends of the shaft are implemented; and
two shearing heads are implemented, and one shearing end of the shaft is fixed on the mounting tube of one of the shearing heads and the other shearing end of the shaft is rotatably and detachably mounted in the other shearing head.

14. The anti-theft fastener as claimed in claim 2, wherein
two shearing ends of the shaft are implemented; and
two shearing heads are implemented, and one shearing end is fixed on the mounting tube of one of the shearing heads and the other shearing end of the shaft is rotatably and detachably mounted in the other shearing head.

15. The anti-theft fastener as claimed in claim 3, wherein
two shearing ends of the shaft are implemented; and
two shearing heads are implemented, and one shearing end is fixed on the mounting tube of one of the shearing heads and the other shearing end of the shaft is rotatably and detachably mounted in the other shearing head.

16. The anti-theft fastener as claimed in claim 3, wherein
the slope of each one of the at least one shearing recess is further inclined from a point adjacent to the abutting surface and the outer edge of the shearing recess and deepens toward a point adjacent to the shearing surface and the inner edge of the shearing recess.

17. The anti-theft fastener as claimed in claim 1, wherein the fastening element is hexagonal.

* * * * *